May 19, 1970  R. HARVIS  3,512,242
PALLET DISMANTLING APPARATUS
Filed March 5, 1968  2 Sheets-Sheet 1
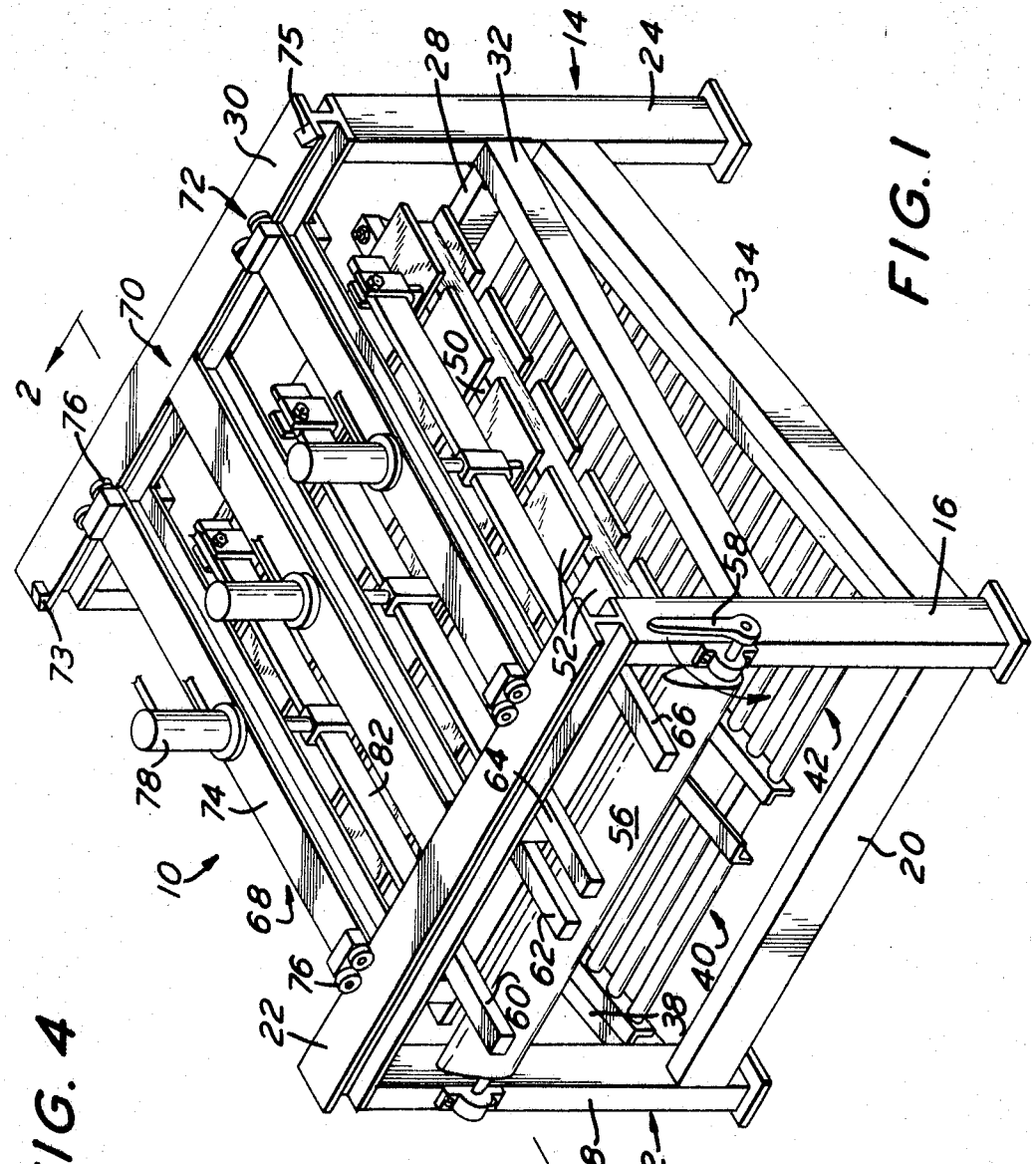
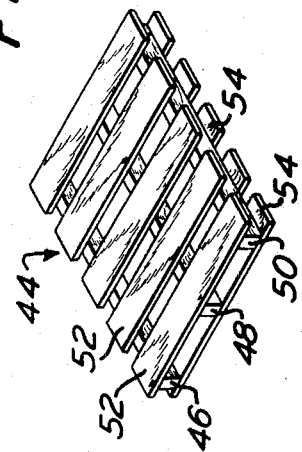
INVENTOR
ROBERT HARVIS
BY
ATTORNEYS.

INVENTOR
ROBERT HARVIS

BY  *Sudil f Hender*

ATTORNEYS.

United States Patent Office 3,512,242
Patented May 19, 1970

3,512,242
PALLET DISMANTLING APPARATUS
Robert Harvis, Delran, N.J., assignor to C. Harvis Sons, Inc., Hurffville, N.J., a corporation of New Jersey
Filed Mar. 5, 1968, Ser. No. 710,560
Int. Cl. B30b 9/00
U.S. Cl. 29—252        8 Claims

ABSTRACT OF THE DISCLOSURE

Apparatus is disclosed for dismantling portable platforms such as wooden pallets into its component pieces without damaging the component pieces. Means are provided to accommodate pallets of different widths.

---

The present invention is directed to apparatus for dismantling portable platforms such as wooden pallets without damaging the component pieces of the wooden pallet. There is a need for such apparatus since wooden pallets occupy a substantial amount of space. Large users of wooden pallets have inventories in the thousands. The value of the pallets is generally exceeded by the cost of returning the pallets to the source of origin.

Hence, wooden pallets have become an inventory problem. One solution to this problem has been the construction of pallets from paper and other lightweight materials which are readily chopped up into small pieces by conventional machinery. When the pallets are made of wood, the only available technique for dismantling the pallets requires a substantial amount of hand labor. The hand labor for dismantling pallets is expensive and substantially exceeds the value of the pallets. Also, use of manual labor for dismantling the pallets frequently damages the components of the pallets. Hence, there is a need for a mechanical device for rapidly separating wooden pallets into their components without damaging the component pieces. Thereafter, the component pieces may be stored in a substantially smaller area than was occupied by the pallet or may be sold as secondhand lumber.

In accordance with the present invention, the apparatus includes a frame supporting a plurality of substantially parallel arms each adapted to enter a pallet and support a portion thereof. One end of the arms is fixedly secured to the frame. The other end of the arms is selectively supported by a movable means on the frame. Power means are provided above the arms for selectively engaging unsupported portions of the pallet and separating the unsupported portions from the portions of a pallet supported by the arms.

It is an object of the present invention to provide a mechanical press for separating portable platforms such as wooden pallets into its component pieces without damaging the component pieces.

It is another object of the present invention to provide a mechanical pallet separating apparatus which is simple, reliable, and inexpensive.

It is another object of the present invention to provide apparatus for separating wooden pallets into its component pieces with minimum damage to the component pieces and with minimum manual labor.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of the apparatus in accordance with the present invention.

FIG. 4 is a perspective view of a wooden pallet adapted to be dismantled by the apparatus of the present invention illustrated in FIGS. 1–3.

Figure 2:
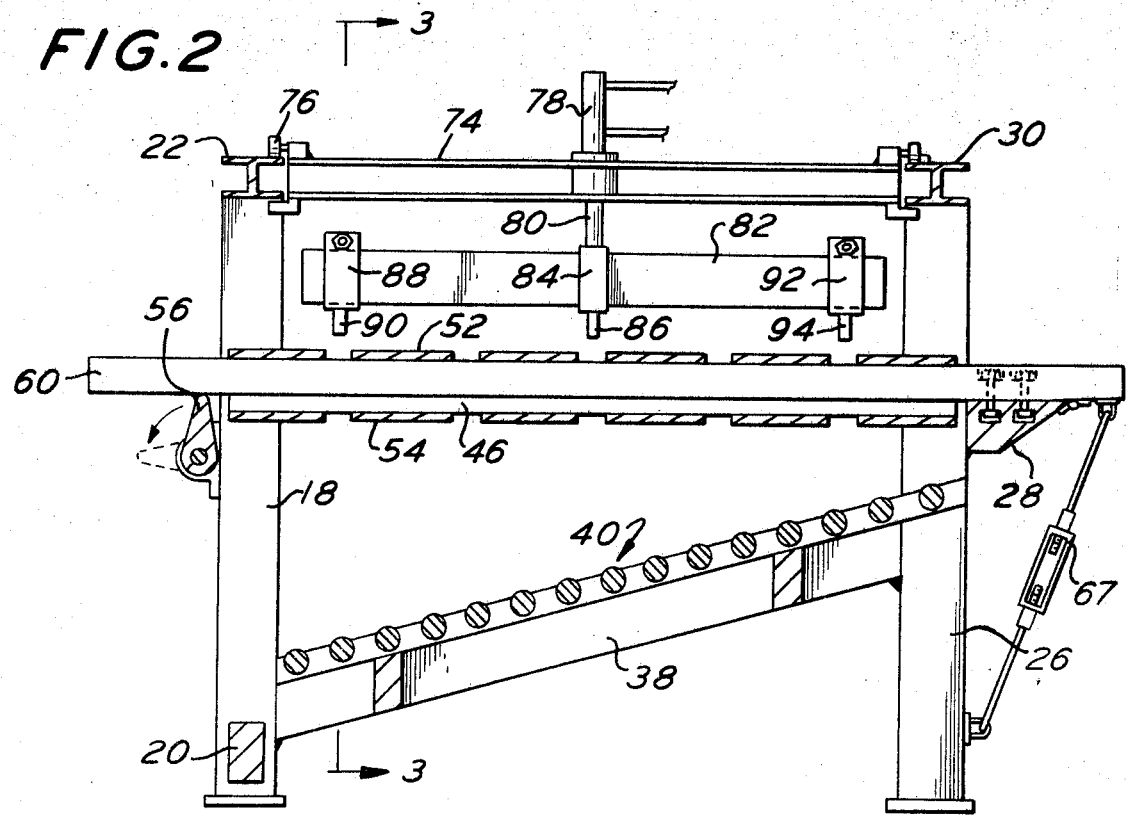
FIG. 2 is a sectional view taken along the line 2—2 in FIG. 1.

Referring to the drawing in detail, wherein like numerals indicate like elements, there is shown in FIG. 1 a pallet dismantling apparatus in accordance with the present invention designated generally as 10. The apparatus 10 includes a frame made from rugged material such as channel irons or hollow tubular iron members. The frame includes end frames 12 and 14.

End frame 12 includes upright posts 16 and 18 interconnected by cross members 20 and 22. Member 22 is in the form of an I-beam and extends across the top of the posts 16 and 18.

End frame 14 includes upright posts 24 and 26 interconnected by cross members 28 and 30. Cross member 30 likewise extends across the top of the posts and is of the same configuration as member 22.

The end frames 12 and 14 are interconnected by rigid braces. Thus, posts 16 and 24 are interconnected by horizontally disposed brace member 32 and angularly disposed brace member 34. Posts 18 and 26 are interconnected by horizontally disposed brace member 36 and angularly disposed brace member 38. The brace members 34 and 38 slope downwardly from end frame 14 towards end frame 12 at an angle of approximately 15 degrees with the horizontal. Two sets of rollers, namely rollers 40 and 42 are supported by the brace members 34 and 38. Rollers 40 and 42 rotate about horizontal axes and lie in a plane which is parallel to the plane of the brace members 34 and 38. Rollers 40 and 42 may extend across the full width of the frame or may be provided with an intermediate support designated as 41.

The apparatus 10 is intended to dismantle portable platforms such as a wooden pallet designated generally as 44 and illustrated in FIG. 4. Pallet 44 includes parallel end runners 46 and 50 and a center runner 48. Boards 52 are nailed to the runners 46–50 on the top surface thereof and parallel to each other as shown in FIG. 4. Similar boards 54 are nailed to the bottom surface of the runners. The apparatus 10 is constructed for the purpose of separating the pallet 44 into a plurality of runners and boards. The runners 46–50 are generally 2 x 4's.

As shown more clearly in FIGS. 1 and 2, the apparatus 10 includes a movable means such as gate 56 rotatably supported at its ends by posts 16 and 18. A handle 58 is fixedly connected to an extension on one end of gate 56 to facilitate rotating the same through an arc of 90 degrees as indicated by the arrows adjacent the gate 56 in FIGS. 1 and 2.

Figure 3:
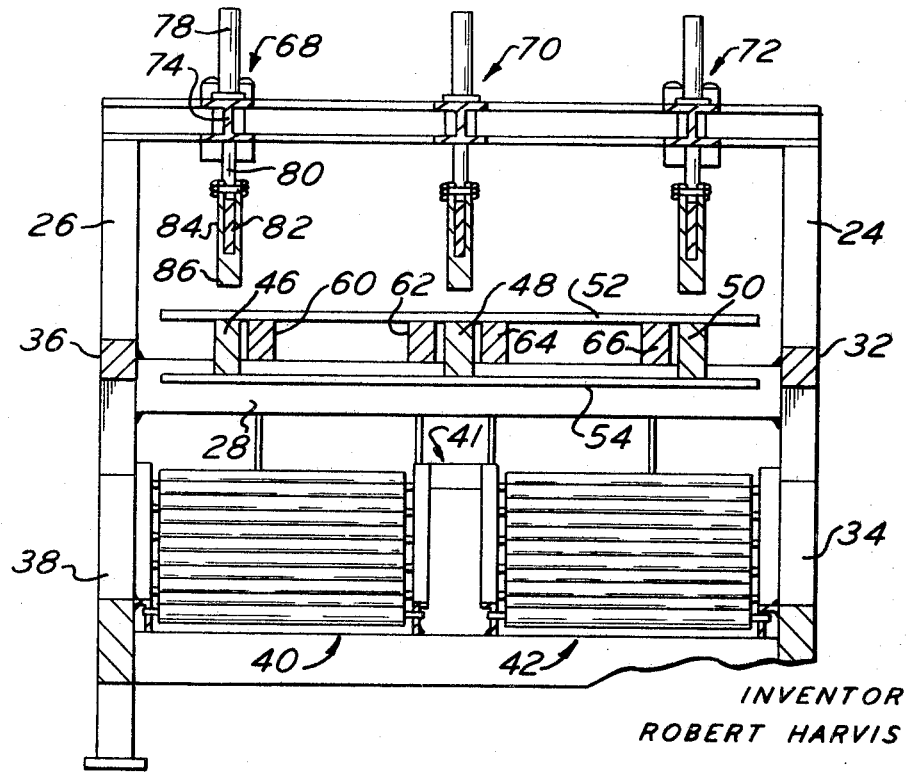
FIG. 3 is a sectional view taken along the line 3—3 in FIG. 2.

When the gate is in the position shown in FIGS. 1 and 2, it supports one end of a plurality of arms 60, 62, 64 and 66. The arms are parallel to one another and are supported at their other end by the cross member 28. When the gate 56 is in the phantom position shown in FIG. 2, the arms constitute cantilever beams. The cross-sectional configuration of the arms is slightly smaller than 2 inches by 4 inches so that the arms may enter the space between the boards 52 and 54 as shown more clearly in FIG. 3.

Power means 68, 70 and 72 are provided above the plane of the arms 60–66. Each power means is identical except as will be made clear hereinafter. Hence, only power means 68 will be described in detail.

Power means 68 includes a rail 74 having rollers 76 at its ends. The rollers 76 are rotatably supported by the cross members 22 and 30. A limit stop 73 is provided on member 30 to limit the extent of movement of rail 74 away from power means 70. A similar limit stop means 75 is provided on member 22 to limit the extent of movement of power means 72 in a direction away from power means 70. Power means 70 differs from power means 68 and 72 only by the fact that its rail is fixedly secured at its ends to the members 22 and 30.

Power means 68 includes a hydraulic cylinder 78 supported by the rail 74. Flexible conduits are utilized to introduce a hydraulic motive fluid into the cylinder 78 so as to cause a piston therein to reciprocate in a vertical direction. A piston rod 80 is connected to the piston. The lower end of piston rod 80 is connected to an arm 82 which is supported by the piston rod and parallel to the rail 74.

Arm 82 includes a jacket 84 having a prong 86 on its lower end. Jacket 84 is fixed to arm 82. A jacket 88 having a prong 90 on its lower end is supported by arm 82 and manually adjustable along the length of arm 82. A similar jacket 92 having a prong 94 on its lower end is adjustably supported by arm 82 and may be manually moved to any desired position along the length thereof. Since power means 70 and 72 are identical with power means 68, except as described above, a detailed description thereof is not deemed necessary.

The apparatus 10 is utilized as follows:

For the purpose of the following description, it is assumed that the apparatus 10 has its components in the position as illustrated in FIG. 1. The handle 58 will be manipulated so as to rotate the gate 56 ninety degrees to the phantom position shown in FIG. 8. At this point, the arms 60–66 will be cantilever beams, the elevation of which can be adjusted by turnbuckles 67 due to the pivotable mounting of arms 60–66 on member 28. The pallet 44 will be picked up and manually telescoped over the arms 60–66 to the position shown in the drawings whereby the boards 52 will be supported by the arms. The runners 46–50 and the boards 54 will not be supported by the arms.

It will be noted that the component pieces of the pallet 44 not supported by the arms will be directly above the rollers 40 and 42. Thereafter, the gate 56 will be rotated to its original position as shown in FIG. 1 so as to be slightly spaced from the lower surface on arms 60–66 by a distance such as ⅛ of an inch. It will be noted that the center runner 48 on the pallet 44 is directly beneath the power means 70. Each of the power means 68 and 72 is either manually or mechanically moved to a position so that they are directly above one of the runners 46 and 50.

The pallet 44 will have previously been positioned so that the prong 86 may engage the upper surface of runner 46 between two adjacent boards 52. The jackets 88 and 92 are moved so that their prongs may likewise engage the upper surface on runner 46 between two adjacent boards 52. The adjustable prongs on the power means 70 and 72 will likewise be positioned so as to engage the upper surface on one of the runners 48 and 50. When a large number of the pallets 44 are being dismantled, these adjustments need only be made in connection with the first pallet.

Thereafter, hydraulic fluid is introduced into the cylinders of the respective power means 68, 70 and 72 to cause the prongs to move downwardly into contact with the upper surface on one of the runners on the pallet 44. Such pressure separates the boards 52 from the remainder of the pallet. The remainder of the pallets falls downwardly a short distance onto the rollers 40 and 42 which causes the same to move forwardly to the front of the apparatus 10. Any suitable means may be utilized thereafter to move all of the boards 52 rearwardly off the end of the arms 60–66.

The remainder of the pallet 44, namely the runners 44–50 which are still nailed to the boards 54 is again processed by the apparatus 10 in the manner described above. However, at this time, the boards 54 will be on the upper surface of the arms 60–66 and supported thereby. The runners 46–50 will be unsupported by the apparatus 10. After initial downward movement and contact with the runners, the power means 68–72 will have retracted to the position shown in the drawings. When the power means again contacts the upper surface of the runners, it will cause the runners 46–50 to separate from the boards 54 and fall down onto the rollers 40 and 42.

Retraction of the power means 68–72 after each step of separating components of the pallet may be simultaneous or sequential. Initiation of such retraction may be by manual operation of a valve, or may be automatic by use of a pressure switch or timer. Each time that pressure is applied to the runner of a pallet, the arms 60–66 deflect slightly until the engage gate 56 which acts as a limit stop and support for the free ends of the arms during the time that pressure is applied to the pallet runners. If necessary, power means 68 and 72 are moved to a position so that their pressure arms are aligned with the end runners of the pallet. Such movement is usually only required when pallets of different widths are being processed.

The runners 46–50 may then be stacked in any desired location. When repeating the process with the next pallet 44, the boards 54 will be pushed off the rear end of the arms as the new pallet is being telescoped over the arms. It is within the scope of the present invention to locate a conveyor adjacent the apparatus 10 so that the component pieces of the pallets may be positioned on the conveyor for movement to any desired stacking areas.

The present invention may be embodied in other specific forms without departing from the spirit or essential attributes thereof and, accordingly, reference should be made to the appended claims, rather than to the foregoing specification as indicating the scope of the invention.

It is claimed:

1. Pallet dismantling apparatus comprising a frame, a plurality of arms on the frame and adapted to enter a pallet and support a portion of the pallet, one end of each arm being supported by the frame, movable means on the frame for selectively supporting the other end of the arms, and power means above the arms and movable to a position to engage unsupported portions of the pallet and separate the same from the portions of the pallet supported by the arms.

2. Apparatus in accordance with claim 1 wherein said movable means includes a gate on the frame and which in one position supports said other end of the arms and in another position frees the same to enable a pallet to be telescoped over the arms.

3. Apparatus in accordance with claim 1 wherein the power means includes a power cylinder, an element associated with the cylinder and vertically disposed for up and down movement when motive fluid is introduced into the cylinder, the lower end of said element supporting a pressure arm, and a plurality of spaced prongs supported by said pressure arm, said pressure arm being generally parallel to said first-mentioned arms.

4. Apparatus in accordance with claim 3 wherein at least some of said prongs are adjustable along the length of said pressure arm for positioning between adjacent boards on a pallet for engagement with a top surface on a runner of the pallet.

5. Apparatus in accordance with claim 1 wherein said power means includes a plurality of parallel devices at least one of which is movable toward and away from the other device so as to facilitate a combination of different widths of pallets.

6. Apparatus in accordance with claim 1 including a plurality of parallel rollers supported below said arms in a sloping plane, with the upper end of said sloping plane being adjacent the fixed end of said arms.

7. Apparatus in accordance with claim 1 wherein said one end of said arms is pivoted to said frame, and an adjustable device for adjusting the elevation of said arms.

8. Pallet dismantling apparatus comprising a frame, a plurality of substantially parallel arms adapted to enter a pallet and support a portion thereof, one end of each arm being fixed to said frame, a movable gate on the frame for selectively supporting the other ends of the arms, said gate being movable to a position so as to permit the pallet to be telescoped over the arms, a set of rollers below said arms and sloping downwardly to a location below said gate, first and second power means supported by said frame above said arms, one of said power means being supported for movement toward and away from the other power means, each power means including a pressure arm having a plurality of prongs, some prongs on each pressure arm being adjustable along the length of the pressure arm, each prong being adapted to engage unsupported portions of the pallet for separating the same from the portion of the pallet supported by said first-mentioned arms whereby a wooden pallet may be separated into its component pieces without damaging the same.

References Cited

UNITED STATES PATENTS

| 3,283,699 | 11/1966 | Hawkins | 29—251 |
| 3,334,580 | 8/1967 | Smith | 100—226 |

OTHELL M. SIMPSON, Primary Examiner

G. F. GRAFEL, Assistant Examiner